United States Patent
Stenneth et al.

(10) Patent No.: US 9,887,793 B2
(45) Date of Patent: *Feb. 6, 2018

(54) METHOD, APPARATUS, AND COMPUTER PROGRAM PRODUCT FOR SELECTING WEATHER STATIONS

(71) Applicant: HERE Global B.V., Eindhoven (NL)

(72) Inventors: Leon Stenneth, Chicago, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,767

(22) Filed: Jan. 18, 2017

(65) Prior Publication Data
US 2017/0324495 A1 Nov. 9, 2017

Related U.S. Application Data

(63) Continuation of application No. 15/148,136, filed on May 6, 2016, now Pat. No. 9,584,237.

(51) Int. Cl.
*H04W 24/00* (2009.01)
*H04H 60/71* (2008.01)
(Continued)

(52) U.S. Cl.
CPC ............ *H04H 60/71* (2013.01); *H04H 60/70* (2013.01); *H04W 4/023* (2013.01); *H04W 88/02* (2013.01)

(58) Field of Classification Search
CPC ......... H04W 64/00; H04W 4/02; H04W 8/18; H04W 8/245; H04W 24/02; H04W 88/02;
(Continued)

(56) References Cited

U.S. PATENT DOCUMENTS 7,406,382 B2 7/2008 Brulle-Drews
8,060,308 B2 11/2011 Breed
(Continued)

FOREIGN PATENT DOCUMENTS

WO WO 2003/000513 A1 1/2003

OTHER PUBLICATIONS

In re: Stenneth; U.S. Appl. titled Selecting a Weather Estimation Algorithm and Providing a Weather Estimate; U.S. Appl. No. 15/077,507, filed Mar. 22, 2016.
(Continued)

*Primary Examiner* — Nhan Le
(74) *Attorney, Agent, or Firm* — Alston & Bird LLP

(57) ABSTRACT

A method is provided herein for selecting a combination of a subset of weather stations from among a plurality of weather stations for estimating the weather at a specific location. The method may include: receiving an indication of a plurality of weather stations within a predefined area, where the predefined area includes a first location; determining, for each of the plurality of weather stations, a distance of the weather station from the first location; calculating, for a plurality of different combinations of subsets of the plurality of weather stations, an average distance of the weather stations of each of the plurality of different combinations from the first location; calculating, for each of the different combinations of subsets, an average location relative to the first location; and selecting a combination of a subset of the plurality of weather stations based on the average distance and the average location.

20 Claims, 6 Drawing Sheets

(51) Int. Cl.
*H04W 4/02* (2009.01)
*H04H 60/70* (2008.01)
*H04W 88/02* (2009.01)

(58) Field of Classification Search
CPC ..... H04L 29/08657; G01S 19/14; G01S 5/02; H04M 2207/18; H04M 1/72525; G06Q 30/02
USPC ....... 455/414.1, 414.2, 414.3, 418–420, 421, 455/422.1, 432.1, 435.1, 456.1, 456.5, 455/456.6, 550.1
See application file for complete search history.

(56) References Cited

U.S. PATENT DOCUMENTS

| | | | |
|---|---|---|---|
| 8,154,398 B2 | 4/2012 | Rolf et al. | |
| 8,314,730 B1 | 11/2012 | Musiak et al. | |
| 8,589,389 B2 | 11/2013 | Bisdikian et al. | |
| 8,607,154 B2 | 12/2013 | Watts et al. | |
| 8,610,566 B2 | 12/2013 | Sznaider et al. | |
| 8,832,121 B2 | 9/2014 | Smith et al. | |
| 9,584,237 B1* | 2/2017 | Stenneth | H04H 60/71 |
| 2005/0222752 A1 | 10/2005 | Sokola et al. | |
| 2008/0168339 A1 | 7/2008 | Hudson et al. | |
| 2014/0358441 A1 | 12/2014 | Supina | |
| 2015/0304813 A1* | 10/2015 | Esposito | H04B 7/155 455/456.2 |
| 2016/0092615 A1* | 3/2016 | Stenneth | G01W 1/00 703/6 |
| 2016/0242098 A1 | 8/2016 | Tsukamoto | |
| 2017/0094590 A1* | 3/2017 | Wang | G01W 1/00 |

OTHER PUBLICATIONS

Interpolation of Observed Weather—Agri4castWiki [online] [retrieved Jun. 10, 2016]. Retrieved from the Internet: <URL: http://marswiki.jrc.ec.europa.eu/agri4castwiki/index.php/Interpolation_of_observed_weather>. 8 pages.

Notice of Allowance from U.S. Appl. No. 15/148,136, dated Oct. 19, 2016, 11 pages.

* cited by examiner

METHOD, APPARATUS, AND COMPUTER PROGRAM PRODUCT FOR SELECTING WEATHER STATIONS

CROSS-REFERENCE TO RELATED APPLICATIONS

This application is a continuation of U.S. patent application Ser. No. 15/148,136, filed on May 6, 2016, the contents of which are herein incorporated by reference in their entirety.

TECHNOLOGICAL FIELD

An example embodiment of the present invention relates to determining a subset of weather stations from a plurality of weather stations to estimate the weather at a first location; and more particularly, to evaluating the best subset of weather stations that is likely to provide the most accurate estimate of weather at a first location.

BACKGROUND

Weather stations may be used to gather information regarding weather-related information at geographically dispersed locations, such that the weather information may be used for historical trend data, current weather reporting, and future weather prediction. Weather stations may include various sensors to gather weather-related information and report an abundance of weather attributes, such as temperature, humidity, barometric pressure, visibility, precipitation, wind speed, wind direction, etc. Weather stations traditionally have included stationary apparatus that included various types of specifically configured sensors to gather weather-related data. These traditional weather stations are conventionally located at airports, military bases, remote outposts, etc. However, mobile technology and the development of smaller, portable sensors capable of gathering weather-related data has resulted in many mobile devices, traditionally not used as weather stations, to function as weather stations. This enables crowd-sourcing of weather-related information. Control systems may request and/or receive weather information from a weather station at a known location for use in providing weather reports and weather forecasts.

One drawback of using location-based weather data from weather stations is that the weather data may only approximate the weather at a location in which a user is interested. Further, the ubiquity of weather stations may result in an abundance of weather-related information, much of which may not be material to the desired weather information.

BRIEF SUMMARY

A method, apparatus, and computer program product are provided in accordance with an example embodiment for selecting a combination of a subset of weather stations from among a plurality of weather stations for estimating the weather at a specific location. According to an example embodiment, methods may include: receiving an indication of a plurality of weather stations within a predefined area, where the predefined area includes a first location; determining, for each of the plurality of weather stations, a distance of the weather station from the first location; calculating, for a plurality of different combinations of subsets of the plurality of weather stations, an average distance of the weather stations of each of the plurality of different combinations from the first location; calculating, for each of the different combinations of subsets of the plurality of weather stations, an average location relative to the first location; and selecting a combination of a subset of the plurality of weather stations based on the average distance for the combination relative to the first location and the average location for the combination relative to the first location for use in conjunction with at least one of subsequent weather updates, mapping, or navigation.

According to some embodiments, the predefined area may be defined by a predefined radius extending from the first location. Calculating, for the plurality of different combinations of subsets of the plurality of weather stations, an average distance of the weather stations of each of the plurality of different combinations from the first location may include calculating, for each combination of a predefined number of weather stations of the plurality of weather stations, an average distance of the weather stations for each combination. A location of a weather station relative to the first location may be determined by converting a latitude and longitude of the weather station to local Cartesian coordinates with the first location being the origin, and summing the values of the Cartesian coordinates for the weather station.

Determining a combination of a subset of the plurality of weather stations based on the average distance for the combination relative to the first location and the average location for the combination relative to the first location may include: applying a first weight to the average distance of each combination of subsets of the plurality of weather stations from the first location to obtain a weighted average distance for each combination; applying a second weight to the average location of each combination of the subsets of the plurality of weather stations relative to the first location to obtain a weighted average location for each combination; summing, for each combination, the weighted average distance and the weighted average location; determining if any of the combinations of subsets of the plurality of weather stations meet a predefined criteria; and selecting a combination of subset of the plurality of weather stations that meets the predefined criteria.

According to some embodiments, the combinations of subsets may include each combination of three weather stations from the plurality of weather stations. In response to determining that none of the combinations of three weather stations of the plurality of weather stations meet the predefined criteria, the method may include: calculating, for each combination of four weather stations of the plurality of weather stations, an average distance of the weather stations from the first location; calculating, for each combination of four weather stations of the plurality of weather stations, an average location relative to the first location; applying a first weight to the average distance of each combination of four weather stations from the first location to obtain a weighted average distance for each combination of four weather stations; applying a second weight to the average location of each combination of four weather stations relative to the first location to obtain a weighted average location for each combination of four weather stations; summing, for each combination of four weather stations, the weighted average distance and the weighted average location; determining if any of the combination of four weather stations meet a predefined criteria; and selecting a combination of four weather stations that meets the predefined criteria.

Embodiments of the present invention may include an apparatus having at least one processor and at least one memory including computer program code. The at least one memory and computer program code may be configured to, with the processor, cause the apparatus to at least: receive an indication of a plurality of weather stations within a predefined area, where the predefined area includes a first location; determine, for each of the plurality of weather stations, a distance of the weather station from the first location; calculate, for a plurality of different combinations of subsets of the plurality of weather stations, an average distance of the weather stations of each of the plurality of different combinations from the first location; calculate, for each of the different combinations of subsets of the plurality of weather stations, an average location relative to the first location; and select a combination of a subset of the plurality of weather stations based on the average distance for the combination relative to the first location and the average location for the combination relative to the first location for use in conjunction with at least one of subsequent weather updates, mapping, or navigation. The predefined area may be defined by a predefined radius extending from the first location.

Causing the apparatus to calculate, for a plurality of different combinations of subsets of the plurality of weather stations, an average distance of the weather stations of each of the plurality of different combinations from the first location may include causing the apparatus to calculate, for each combination of a predefined number of weather stations of the plurality of weather stations, an average distance of the weather stations of each combination. A location of a weather station relative to the first location may be determined by causing the apparatus to convert a latitude and longitude of the weather station to local Cartesian coordinates with the first location being the origin, and summing values of the Cartesian coordinates for the weather station.

According to some embodiments, causing the apparatus to determine a combination of a subset of the plurality of weather stations based on the average distance for the combination relative to the first location and the average location for the combination relative to the first location may include causing the apparatus to: apply a first weight to the average distance of each combination of subsets of the plurality of weather stations from the first location to obtain a weighted average distance for each combination; apply a second weight to the average location of each combination of subsets of the plurality of weather stations relative to the first location to obtain a weighted average location for each combination; sum, for each combination, the weighted average distance and the weighted average location; determine if any of the combination of subsets of the plurality of subsets of weather stations meets a predefined criteria; and select a combination of subsets of the plurality of weather stations that meets the predefined criteria. The combination of subsets includes each combination of three weather stations from the plurality of weather stations.

In response to the apparatus determining that none of the combinations of three weather stations of the plurality of weather stations meet the predefined criteria, the apparatus may be caused to: calculate, for each combination of four weather stations of the plurality of weather stations, an average distance of the weather stations from the first location; calculate, for each combination of four weather stations from the plurality of weather stations, an average location relative to the first location; apply a first weight to the average distance of each combination of four weather stations from the first location to obtain a weighted average distance for each combination of four weather stations; apply a second weight to the average location of each combination of four weather stations relative to the first location to obtain a weighted average location for each combination of four weather stations; sum, for each combination of four weather stations, the weighted average distance and the weighted average location; determine if any of the combination of four weather stations meet a predefined criteria; and select a combination of four weather stations that meets the predefined criteria.

Embodiments of the present invention may provide a computer program product having at least one non-transitory computer-readable storage medium having computer-executable program code portions stored therein. The computer-executable program code portions comprising program code instructions configured to: receive an indication of a plurality of weather stations within a predefined area, where the predefined area comprises a first location; determine, for each of the plurality of weather stations, a distance of the weather station from the first location; Calculate, for a plurality of different combinations of subsets of the plurality of weather stations, an average distance of the weather stations of each of the plurality of different combinations from the first location; calculate, for each of the different combinations of subset of the plurality of weather stations, an average location relative to the first location; and select a combination of a subset of the plurality of weather stations based on the average distance for the combination relative to the first location and the average location for the combination relative to the first location for use in conjunction with at least one of subsequent weather updates, mapping, or navigation.

The program code instructions configured to calculate, for a plurality of different combinations of subsets of the plurality of weather stations, an average distance of the weather stations of each of the plurality of different combinations from the first location comprises program code instructions configured to calculate, for each combination of a predefined number of weather stations of the plurality of weather stations, an average distance of the weather stations of each combination. A location of a weather station relative to the first location may be determined by program code instructions configured to: convert a latitude and a longitude of the weather station to local Cartesian coordinates with the first location being the origin, and summing values of the Cartesian coordinates for the weather station.

According to some embodiments, the program code instructions configured to determine a combination of a subset of the plurality of weather stations based on the average distance for the combination relative to the first location and the average location for the combination relative to the first location may include program code instructions configured to: apply a first weight to the average distance of each combination of subsets of the plurality of weather stations from the first location to obtain a weighted average distance for each combination; apply a second weight to the average location of each combination of subsets of the plurality of weather stations relative to the first location to obtain a weighted average location for each combination; sum, for each combination, the weighted average distance and the weighted average location; determine if any of the combination of subsets of the plurality of weather stations meet a predefined criteria; and select a combination of subsets of the plurality of weather stations that meets the predefined criteria.

The combination of subsets may include each combination of three weather stations from the plurality of weather stations. In response to the program code instructions determining that none of the combinations of three weather stations of the plurality of weather stations meet the predefined criteria, the computer program product may further include program code instructions configured to: calculate, for each combination of four weather stations of the plurality of weather stations, an average distance of the weather stations from the first location; calculate, for each combination of four weather stations of the plurality of weather stations, an average location relative to the first location; apply a first weight to the average distance of each combination of four weather stations from the first location to obtain a weighted average distance for each combination of four weather stations; apply a second weight to the average location of each combination of four weather stations relative to the first location to obtain a weighted average location for each combination of four weather stations; sum, for each combination of four weather stations, the weighted average distance and the weighted average location; determine if any of the combinations of four weather stations meet a predefined criteria; and select a combination of four weather stations that meets the predefined criteria.

BRIEF DESCRIPTION OF THE DRAWINGS

Figure 1:
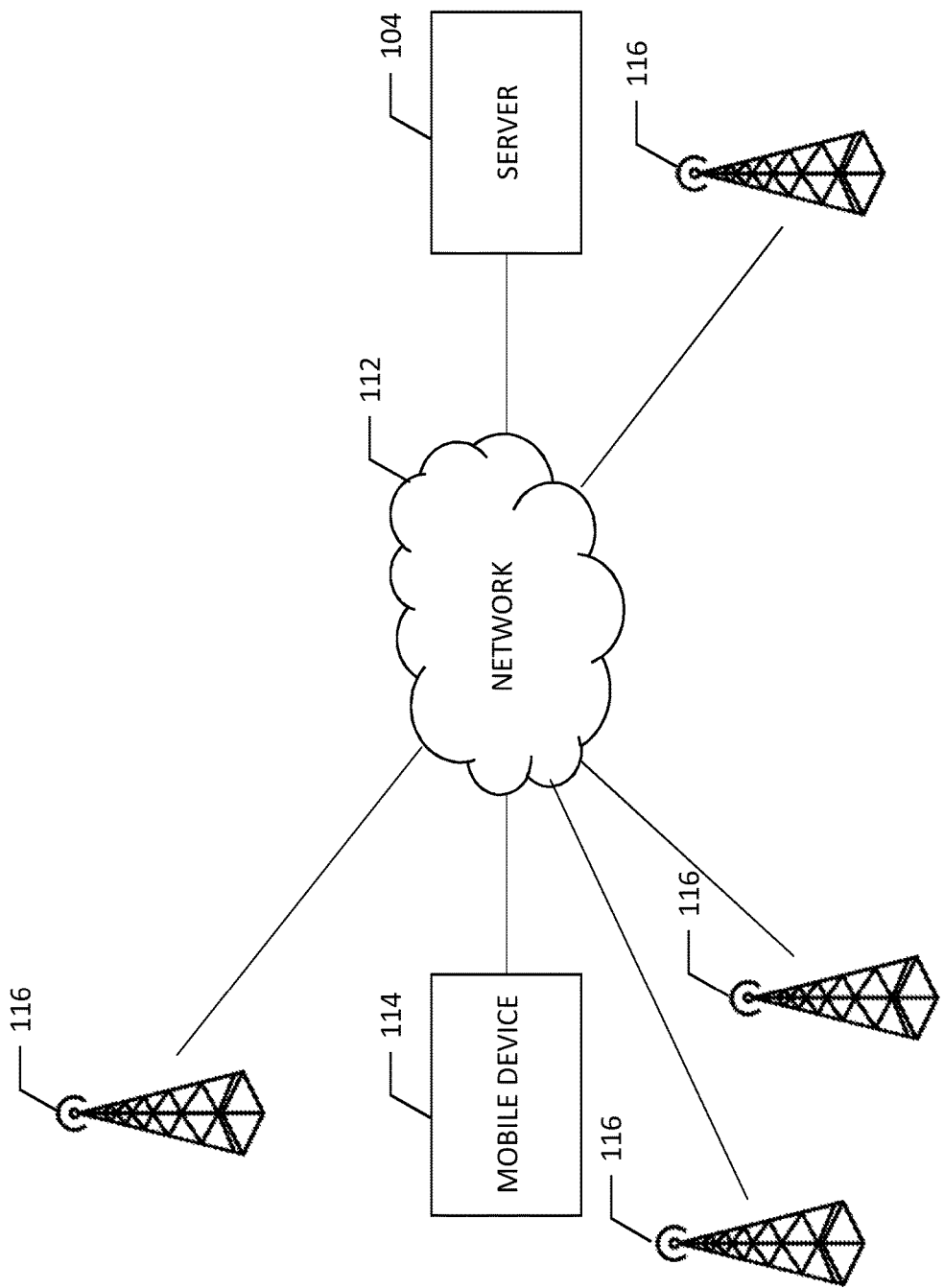
Figure 2:
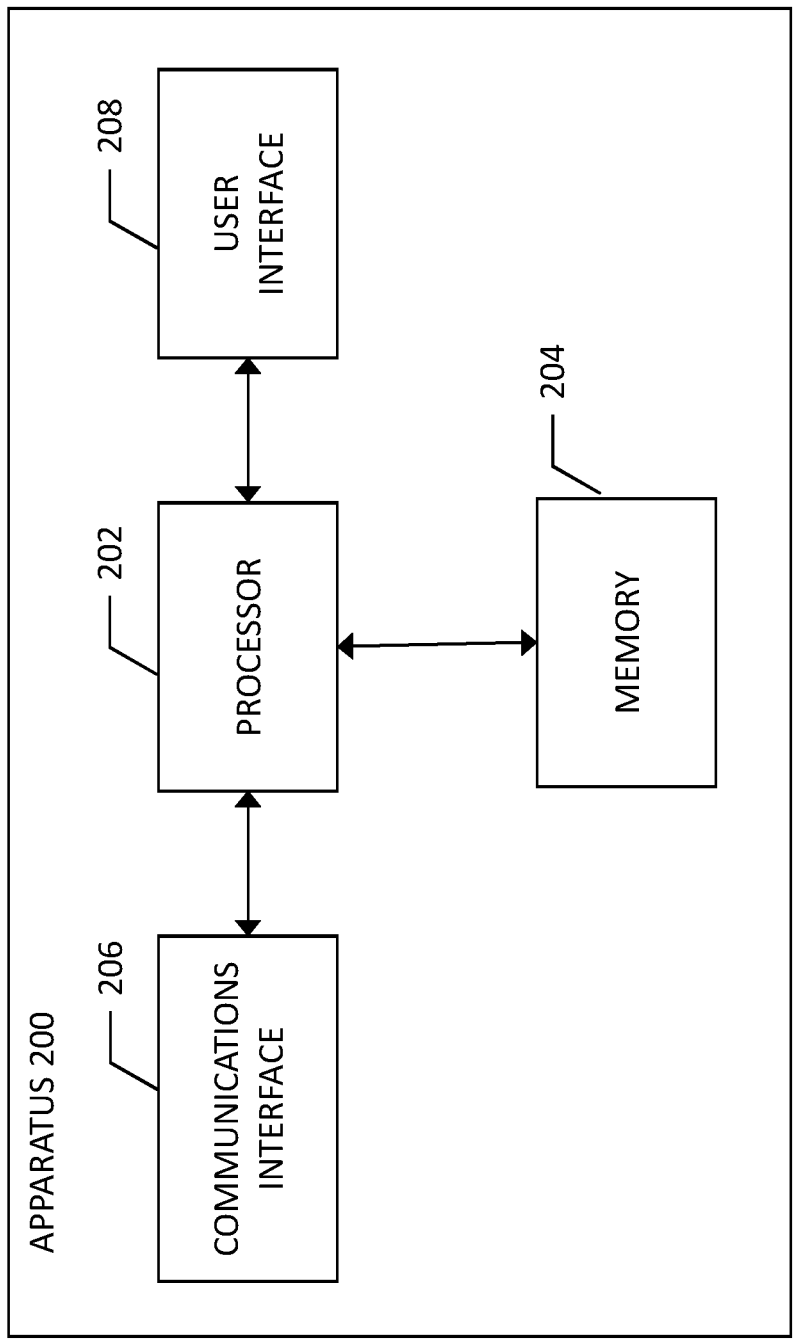
Figure 3:
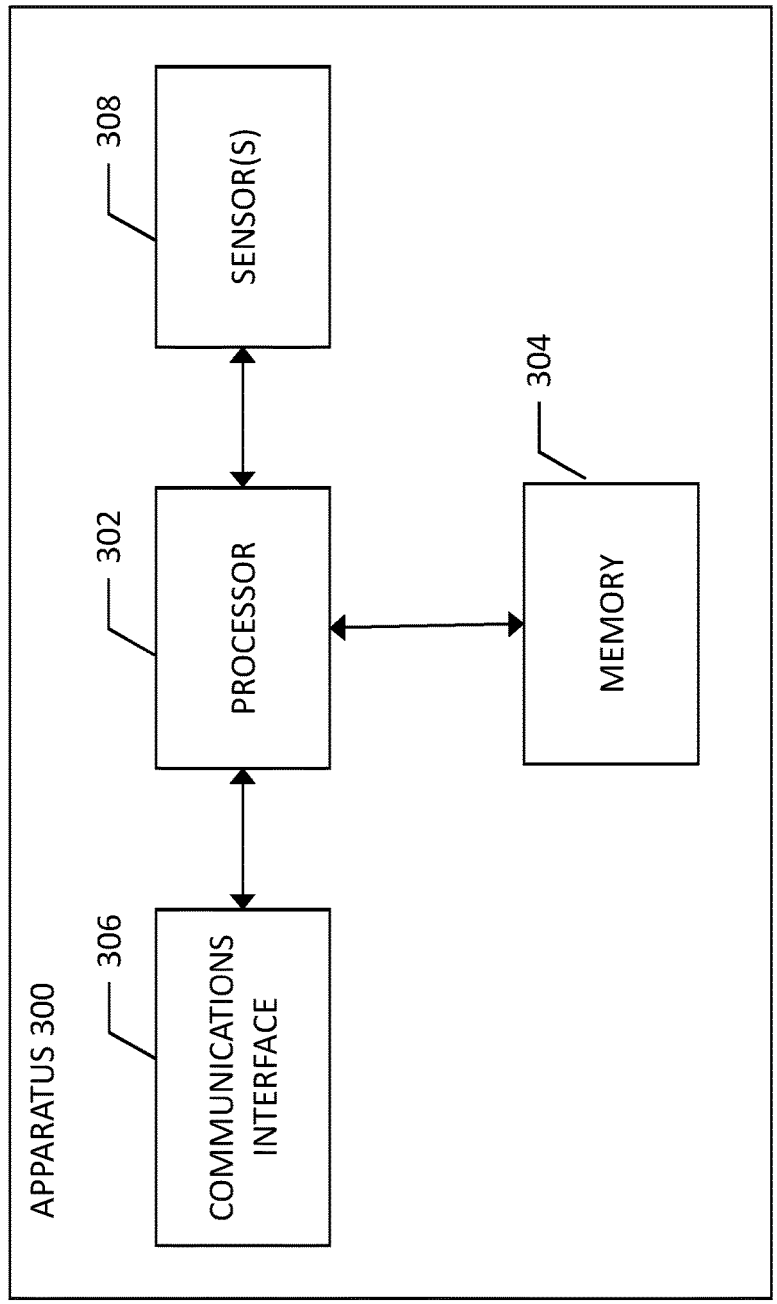
Figure 4:
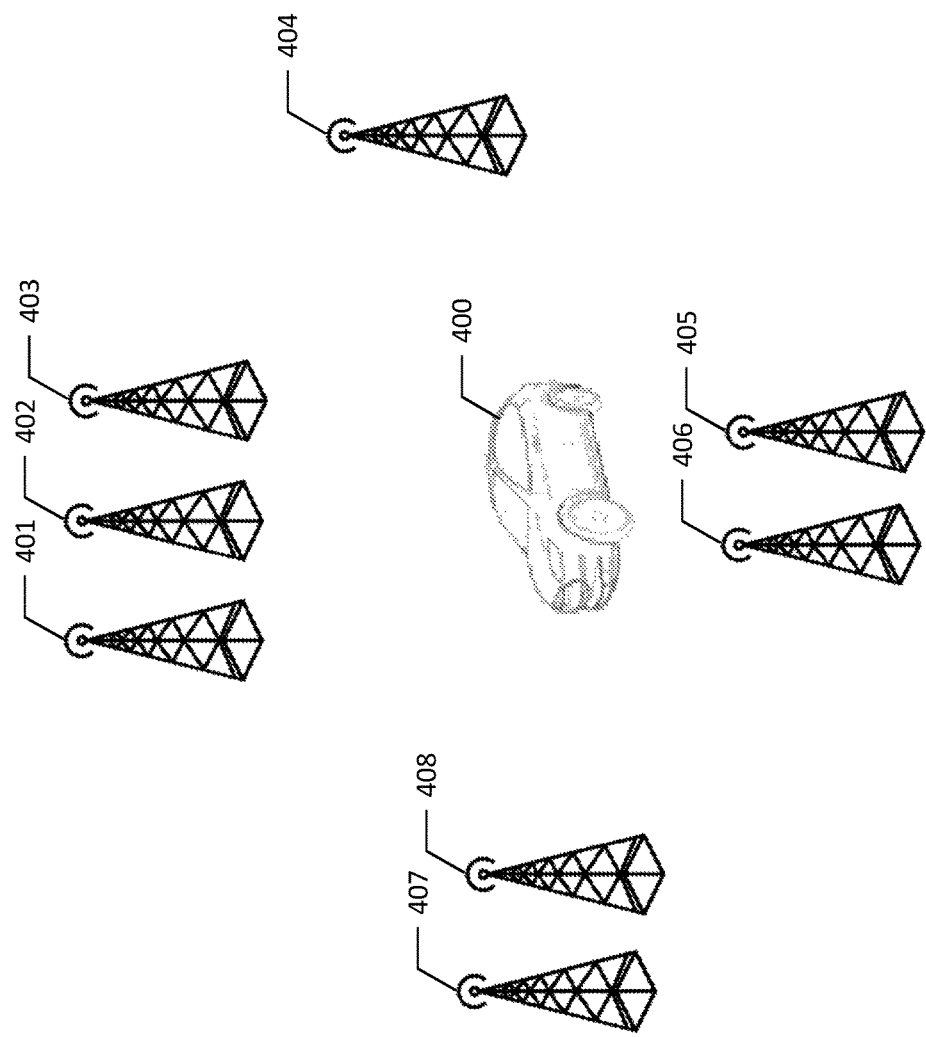
Figure 5:
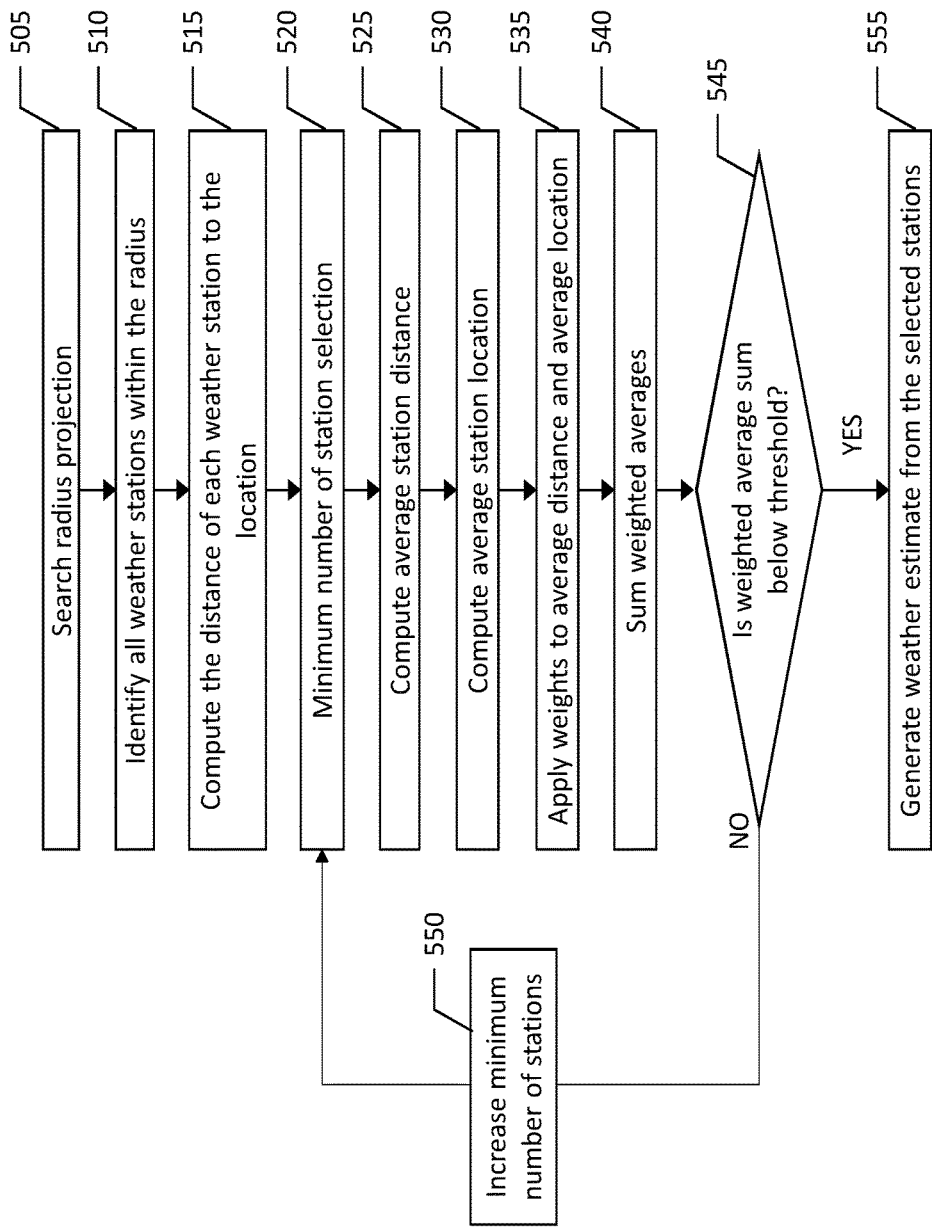
Figure 6:
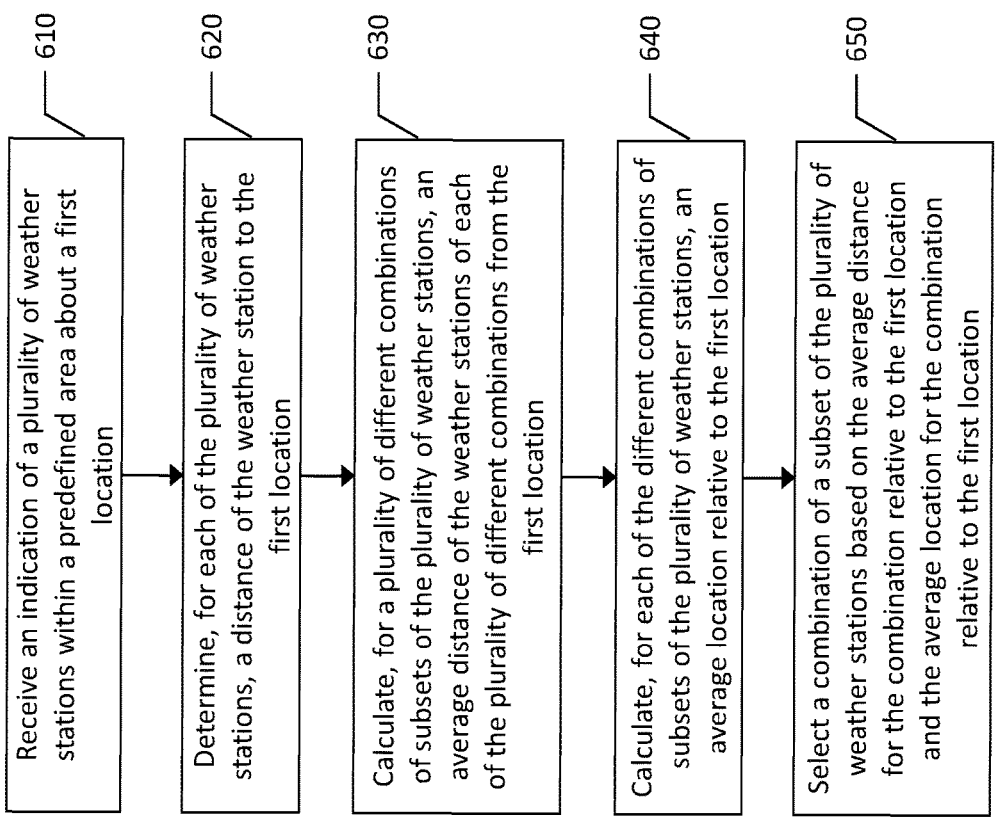

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for selecting a subset combination of weather stations from among a plurality of weather stations in accordance with an example embodiment of the present invention;

FIG. 3 illustrates a block diagram of a weather station apparatus according to an example embodiment of the present invention;

FIG. 4 depicts a schematic of a plurality of weather stations within a predefined area around a first location according to an example embodiment of the present invention;

FIG. 5 is a flowchart of an algorithm for selecting a combination of a subset of weather stations from among a plurality of weather stations according to an example embodiment of the present invention; and FIG. 6 is a flowchart of a method for selecting a combination of a subset of weather stations from among a plurality of weather stations according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for selecting the minimum number of weather stations to provide an estimation of weather for a given location. FIG. 1 illustrates a communication diagram of an example embodiment of a system for implementing example embodiments described herein. The illustrated embodiment of FIG. 1 includes a server 104, a mobile device 114, and a plurality of weather stations 116 communicating via network 112. The mobile device 114 may be a device such as a cellular telephone, mobile computer, or the like, and may be associated with or integrated with a vehicle, such as navigation system or driver information system of a vehicle. Additional, different, or fewer components may be provided. For example, many mobile devices 114 and/or weather stations 116 may connect with the network 112. The server 104 may include a geographic repository or database of the presence and locations (e.g., coordinates) of weather stations available in a region. The network may be wired, wireless, or any combination of wired and wireless communication networks, such as cellular, Wi-Fi, internet, local area networks, or the like.

The mobile device 114 may include a mobile computing device such as a laptop computer, tablet computer, mobile phone, smart phone, navigation unit, personal data assistant, watch, camera, or the like. Server 104 may be one or more fixed or mobile computing devices. The mobile device 114 may be configured to access the server 104 through, for example, a weather application, such that the mobile device 114 may access the weather station information via the network 112 directly, or via the server 104 functioning as an intermediary.

An example embodiment of a mobile device 114 may be embodied in an apparatus as illustrated in FIG. 2. The apparatus 200, such as that shown in FIG. 2, may be specifically configured in accordance with an example embodiment of the present invention for selecting a subset of available weather stations to more efficiently determine weather proximate a specific location. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by mobile device 114. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

FIG. 3 illustrates an example block diagram of a weather station embodied by apparatus 300. For example, a weather station may include one or more sensors 308 for detecting, measuring, sensing, and/or the like one or more weather-related parameters. Some non-limiting examples of such parameters may include air temperature (including wet-bulb temperature and dry-bulb temperature), dew point temperature, barometric pressure, visibility, humidity, precipitation intensity, precipitation type, cloud cover, storm severity, etc. A weather station apparatus 300 of example embodiments may include sensors to determine one or more of the aforementioned weather-related parameters. The weather station apparatus 300 may include a processor 302 configured to receive weather-related parameter information/data from the one or more sensors 308, memory 304, and communications interface 306. In various embodiments, the processor 302, memory 304, and communications interface 306, may be similar components to that of apparatus 200, as described elsewhere herein.

According to embodiments described herein, a weather station apparatus 300 may be a static weather station. For example, the location of the weather station apparatus 300 may be fixed and unchanging. Such weather stations may be located at an airport, city center, or other such point-of-interest, for example. Weather station apparatuses may optionally be mobile, such as a weather station apparatus mounted to a vehicle (e.g., a storm-chasing vehicle), or as a mobile station that may be temporarily placed at specific locations (e.g., on a field for a sporting event). Further, as sensor technology has advanced and costs have decreased, many mobile devices, such as a smart phone or mobile computing device, may be capable of functioning as a weather station providing some or all of the weather related information traditionally gathered at fixed weather stations. As such, according to some embodiments, a mobile weather station apparatus 300 may include a smart phone or mobile computing device. Weather station apparatuses may include a location sensor (e.g., GPS sensor), particularly when the weather station apparatus is mobile, for determining and providing the weather station location information indicative of the location of the weather station apparatus. A fixed-location weather station apparatus 300 may optionally include a location sensor, but may optionally have the station location stored therein for reporting as needed or as requested. Optionally, fixed-location weather stations may have unique identifications, where a database, such as memory 204 of apparatus 200, may store the fixed location associated with the unique identification of a weather station.

Example embodiments of the present invention may be provided to establish a weather estimate for a specific location. In particular, based on the relative position of a plurality of weather stations with respect to the location, a weather estimate is generated based on a selection of a subset of the plurality of weather stations. The weather estimate generated based on the selected subset of weather stations, and may be used for a variety of purposes, such as in weather updates to a user, mapping of weather estimates, or navigation (e.g., avoiding certain weather conditions). A user, such as a user of mobile device 114 of FIG. 1 embodied by apparatus 200, may request a weather estimate for a location. The request location information may be based on the location of the mobile device 114, or the location may be remote from the device and selected by the user. The weather estimate may be based on a plurality of weather stations within a predefined distance of the location. The weather estimate may be determined via algorithms that interpret and use weather-related data gathered by the weather stations to provide an accurate estimation of weather at a specific location.

While example embodiments described herein refer generally to a "weather estimate" for a location, the weather estimate may be past, present, or future predicted weather for the location. Historical weather-related sensor readings from the weather stations of a selected combination of weather stations may be used to determine or estimate the weather at a point of time in the past at the location. Similarly, the historical information collected by the selected combination of weather stations may be used as trend information to determine what the weather will be like at a point in time in the future. The combination of weather stations may also be used to determine an estimate of the current weather at the given location, such that methods described herein can be used in any such implementation.

A location for which a weather estimate is requested may have dozens, hundreds, or even thousands of weather stations within the predefined distance of the location. Conventionally, information from each of these weather stations may be used to provide the estimate of the weather at the location. However, this requires substantial computational time and resources. If the number of weather stations within a predefined distance of a location is relatively high, the processing time and memory consumption may introduce latency in the weather estimate for the location, and the weather estimate may not be accurate for the specific location, particularly when weather across the predefined area varies. Provided herein is a method, apparatus, and computer program product to evaluate the available weather stations within a predefined distance of a location and select the minimum number of weather stations with a well-defined geometric layout relative to the location. Embodiments described herein ensure that the subset of weather stations selected provide a weather estimate for the given location that is both more accurate and more efficiently determined relative to conventional methods.

FIG. 4 illustrates an example embodiment of a mobile device, which in the depicted embodiment is within or embodied by a vehicle 400, where the vehicle 400 within a predefined distance of a plurality of weather stations 401-408. According to example embodiments of the present invention, only a portion or a subset of the plurality of weather stations may be needed to provide an accurate estimate of the weather at the location of the vehicle 400. Embodiments described herein select the minimum number of weather stations surrounding the location to provide the accurate weather estimate. In the illustrated embodiment of FIG. 4, for example, weather stations 401, 402, and 403, are very close to one another such that they may be redundant, and only one of the three may be needed. Embodiments described herein may select, for example, weather stations 404, 406, and 408, to provide a good estimation of the weather at the location of the vehicle 400. Alternatively, weather stations 408, 405, and 404, may be used to provide a good estimation of weather at the location of the vehicle 400. However, the selection of the most appropriate weather stations to use is not a trivial matter, and embodiments described herein automate the selection of weather stations to provide the most accurate and efficient weather estimate for a specific location.

FIGS. 5 and 6 depict flowcharts illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus 200. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In order to select a subset of the plurality of weather stations within a predefined distance of a given location, an algorithm has been developed to ensure the weather stations selected provide an efficient and accurate estimate of the weather. FIG. 5 illustrates a flowchart representative of an example embodiment of an algorithm in accordance with example embodiments of the present invention. A request for a weather estimate at a location may initiate the algorithm, where the request may be manually generated by a user, generated autonomously by a device, such as a navigation application, or generated periodically. In response to the weather estimate request, a search radius projection may be established from the location at which the weather estimate is requested at 505. While the flowchart depicts a search radius, the shape of the region in which weather stations are sought may not necessarily be circular. For example, in an embodiment in which a search radius may include geographic anomaly, such as a high mountain peak with different meteorological conditions, the area may be defined to exclude such an anomaly. At 510, the weather stations within the area are identified. The distance of each weather station to the location may be computed at 515, such as by processor 202, using the location of each respective weather station (identified either by the weather stations themselves or based on the stored location of uniquely identified weather stations) relative to the location for which the weather estimate is sought.

A minimum number of stations may be selected at 520, where every combination of that minimum number of stations out of the plurality of stations identified within the area is identified. For example, if there are 10 weather stations WS-A through WS-J, and the minimum number of weather stations is identified as three, the combinations may include: (WS-A, WS-B, WS-C); (WS-A, WS-B, WS-D); (WS-A, WS-B, WS-E) . . . (WS-H, WS-I, WS-J), or 120 different combinations. The combinations are without regard for the order in which the weather stations are combined as the order has no effect on the result. For each different combination established at 520, an average distance is calculated at 525 between the location for which the weather estimate is sought and the distances to the weather stations of that combination. At 530, an average station location is computed between the weather stations of each combination and the location at which the weather estimate is sought. This calculation may be performed to establish a numerical estimation of the geometric layout of the weather stations around the location. For each combination, the geographic coordinates for each weather station (e.g., in latitude and longitude) may be converted to local Cartesian coordinates (x and y) with the location for which the weather estimate is sought being the origin of the Cartesian coordinates (x=0 and y=0). The summation of the weather stations x- and y-coordinates divided by the number of stations provides the average weather station location. Table 1 below illustrates a portion of the different combinations of weather stations (WS-A through WS-J) including their average distance from the location at which the weather estimate has been requested.

| Set of three stations | Average distance of the set of stations from the location | Distance of average location to the location (Geometric layout of stations) |
| --- | --- | --- |
| {WS-A, WS-B, WS-C} | X km | A km |
| {WS-B, WS-D, WS-F} | Y km | B km |
| {WS-A, WS-D, WS-E} | Z km | C km |
| . . . | . . . | . . . |

For each combination, a first weight is applied to the average distance of the set of weather stations, and a second weight is applied to the average location of the combination, as shown at 535. The two weights are user configurable and may sum to one. The weights are user configurable in order to emphasize the more important characteristics desired of the selected weather stations, such as whether average distance is more critical, or if average location is more critical. If it is desired for the location at which the weather estimate is requested to be well surrounded (e.g., geometrically or geographically) by weather stations, then the second weight, applied to the average location, would be greater than the first weight, applied to the average distance. Conversely, if it is desired to prioritize proximity of weather stations to the location at which the weather estimate is requested over geometric dispersion, the first weight may be greater than the second weight. The calculation is performed, for each weather station combination, according to the following equation, applied at 540 of the flowchart of FIG. 5:

Combination Score=(Weight 1)×(Average distance)+ (Weight 2)×(Average location)

The weighted function to produce the combination score for each combination of weather stations may be compared against a predefined value. The predefined value may be based on a quality measure, such that a combination score greater than the predefined value may be of poorer quality than is desirable. A combination score that is below a predefined value may be considered of sufficient quality to provide an accurate estimate of the weather at the location. This comparison to the predefined value is performed at 545 of the flowchart of FIG. 5.

According to an example embodiment, an implementation of the selection of a minimum number of weather stations to provide an accurate weather estimate for a given location may ensure that the selected subset of weather stations geometrically surrounds the device or the location of the device for which an estimation of weather is to be provided. This geometric surrounding helps ensure that the estimated weather is not skewed away from the location to a location, which may be proximate to the specified location, but may have a substantially different weather estimate.

At decision block 545, if the weighted average sum of 540 is above the predefined value, the minimum number of stations is increased. For example, at 520, if the minimum number of weather stations is initially set to three stations, in response to the weighted average sum being above the predefined value, the minimum number of weather stations is increased to four stations at 550 before returning to operation 520. This increase in the number of minimum stations enables the potential for greater geographic dispersion and can potentially reduce the average distance to the selected weather stations, such that the likelihood of finding a combination of weather stations for which the weighted average sum is below the predefined value at 545. In response to the weighted average sum being below the predefined value at 545, a combination of weather stations is selected at 555 for the generation of a weather estimate for the location.

According to some embodiments, multiple combinations of weather stations may have weighted average sum below the predefined value. This may particularly be the case in a location where weather stations are prevalent and ubiquitous. In such an embodiment, the combination with the lowest weighted average sum may be selected for use in generating the weather estimate at the location.

The method illustrated in the flowchart of FIG. 5 may be limited to the number of loops that can be made through 545 to 550 to 520. For example, if using three weather stations as the minimum number initially, in response to the weighted average sum being above the predefined value for three weather stations and four weather stations (e.g., where two loops have been completed), a conclusion may be reached that the location at which the weather estimate is sought does not have sufficient weather station proximity or dispersion to complete the task. The number of iterations or loops may be user configured; however, with an increase in the number of allowed loops, and allowed minimum number of weather stations, comes an increase to the computational costs which this method seeks to minimize. As such, in response to a determination being made that the location lacks sufficient weather stations, a substitute method of weather estimation may be performed. If a substitute method, such as a conventional weather estimation method is performed, a user may be informed that the weather estimate is potentially less accurate due to the lack of sufficient weather stations proximate the location.

Once a combination of weather stations has been selected for generating an estimate of the weather at the location, a weather estimation algorithm may be selected to provide the weather estimation to a user.

FIG. 6 illustrates a method for selecting a subset of weather stations from among a plurality of weather stations to provide a weather estimate at a location. The method of FIG. 6 begins at 610 by receiving an indication of a plurality of weather stations within a predefined area about a first location. This indication may come from the weather stations themselves (e.g., weather stations 116 of FIG. 1 communicating with mobile device 114 via network 112), or alternatively, the locations of weather stations 116 may be stored in a memory, such as a memory of server 104, such that the server may identify the weather stations 116 within a predefined area about the first location. For each of the plurality of weather stations, a distance of the weather station to the first location may be determined at 620. This may be performed by, for example, mobile device 114 using processor 202, or performed remotely via server 104. A plurality of different combinations of subsets of the weather stations may be determined, and for each combination, an average distance between the weather stations and the first location may be calculated as shown at 630. For each of the different combinations, an average location relative to the first location may be calculated at 640. A combination of a subset of the plurality of weather stations may be selected at 650 based on the average distance for the combination relative to the first location and the average location for the combination relative to the first location. The selected combination may subsequently be used for weather updates, mapping, navigation, etc.

In an example embodiment, an apparatus for performing the methods of FIG. 5 or 6 above may comprise a processor (e.g., the processor 202) configured to perform some or each of the operations (505-555 or 610-650) described above. The processor may, for example, be configured to perform the operations (505-555 or 610-650) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 505-555 or 610-650 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving an indication of a plurality of weather stations within a predefined area, wherein the predefined area comprises a first location;
determining, for each of the plurality of weather stations, a location of the weather station relative to the first location;
establishing every possible combination of a predetermined number of weather stations from the plurality of weather stations;

calculating for each combination of the predetermined number of weather stations, an average location of the weather stations in the combination relative to the first location; and selecting a combination from among every possible combination based at least in part on the average location of the selected combination from the first location for use in conjunction with at least one of subsequent weather updates, mapping, or navigation.

2. The method of claim 1, wherein the predefined area is defined by a predefined radius extending from the first location.

3. The method of claim 1, wherein the predetermined number of weather stations is a first predetermined number, wherein every possible combination of the first predetermined number is every possible first combination, and wherein selecting a first combination from among every possible first combination based on the average location of the selected combination comprises:

selecting a first combination from among every possible first combination of the first predetermined number of weather stations in response to the average location of the selected first combination satisfying a predetermined criteria;

in response to the average location of every possible first combination of the first predetermined number of weather stations failing to satisfy the predetermined criteria:

establishing every possible second combination of a second predetermined number of weather stations from the plurality of weather stations;

calculating for each second combination of the second predetermined number of weather stations, an average location of the weather stations in the second combination relative to the first location; and selecting a second combination from among every possible second combination based on the average location of the selected second combination relative to the first location for use in conjunction with at least one of subsequent weather updates, mapping, or navigation.

4. The method of claim 3, wherein the second predetermined number is greater by one than the first predetermined number.

5. The method of claim 1, wherein a location of a weather station relative to the first location is determined by:

converting a latitude and longitude of the weather station to local Cartesian coordinates with the first location being the origin, and summing values of the Cartesian coordinates for the weather station.

6. The method of claim 1, further comprising:

determining, for each of the plurality of weather stations, a distance of the weather station from the first location; and calculating, for each combination of the predetermined number of weather stations, an average distance of the weather stations in the combination from the first location;

wherein selecting a combination from among every possible combination based at least in part on the average location of the selected combination from the first location comprises selecting a combination from among every possible combination based at least in part on the average location of the selected combination from the first location and the average distance of the selected combination from the first location.

7. The method of claim 6, wherein selecting a combination from among every possible combination based at least in part on the average location of the selected combination from the first location and the average distance of the selected combination from the first location comprises:

applying a first weight to the average location for each combination to obtain a weighted average location for each combination;

applying a second weight to the average distance for each combination to obtain a weighted average distance for each combination; and selecting a combination from among every possible combination based on a respective weighted average distance and weighted average location.

8. An apparatus comprising at least one processor and at least one memory including computer program code, the at least one memory and computer program code configured to, with the processor, cause the apparatus to at least:

receive an indication of a plurality of weather stations within a predefined area, wherein the predefined area comprises a first location;

determine, for each of the plurality of weather stations, a location of the weather station relative to the first location;

establish every possible combination of a predetermined number of weather stations from the plurality of weather stations;

calculate for each combination of the predetermined number of weather stations, an average location of the weather stations in the combination relative to the first location; and select a combination from among every possible combination based at least in part on the average location of the selected combination from the first location for use in conjunction with at least one of subsequent weather updates, mapping, or navigation.

9. The apparatus of claim 8, wherein the predefined area is defined by a predefined radius extending from the first location.

10. The apparatus of claim 8, wherein the predetermined number of weather stations is a first predetermined number, wherein every possible combination of the first predetermined number is every possible first combination, and wherein causing the apparatus to select a first combination from among every possible first combination based on the average location of the selected combination comprises causing the apparatus to:

select a first combination from among every possible first combination of the first predetermined number of weather stations in response to the average location of the selected first combination satisfying a predetermined criteria;

in response to the average location of every possible first combination of the first predetermined number of weather stations failing to satisfy the predetermined criteria:

establish every possible second combination of a second predetermined number of weather stations from the plurality of weather stations;

calculate for each second combination of the second predetermined number of weather stations, an average location of the weather stations in the second combination relative to the first location; and select a second combination from among every possible second combination based on the average location of the selected second combination relative to the first location for use in conjunction with at least one of subsequent weather updates, mapping, or navigation.

11. The apparatus of claim 10, wherein the second predetermined number is greater by one than the first predetermined number.

12. The apparatus of claim 8, wherein a location of a weather station relative to the first location is determined by:
converting a latitude and longitude of the weather station to local Cartesian coordinates with the first location being the origin, and summing values of the Cartesian coordinates for the weather station.

13. The apparatus of claim 8, wherein the apparatus is further caused to:
determine, for each of the plurality of weather stations, a distance of the weather station from the first location; and
calculate, for each combination of the predetermined number of weather stations, an average distance of the weather stations in the combination from the first location;
wherein causing the apparatus to select a combination from among every possible combination based at least in part on the average location of the selected combination from the first location comprises causing the apparatus to select a combination from among every possible combination based at least in part on the average location of the selected combination from the first location and the average distance of the selected combination from the first location.

14. The apparatus of claim 13, wherein causing the apparatus to select a combination from among every possible combination based at least in part on the average location of the selected combination from the first location and the average distance of the selected combination from the first location comprises causing the apparatus to:
apply a first weight to the average location for each combination to obtain a weighted average location for each combination;
apply a second weight to the average distance for each combination to obtain a weighted average distance for each combination; and
select a combination from among every possible combination based on a respective weighted average distance and weighted average location.

15. A computer program product comprising at least one non-transitory computer-readable storage medium having computer-executable program code portions stored therein, the computer-executable program code portions comprising program code instructions configured to:
receive an indication of a plurality of weather stations within a predefined area, wherein the predefined area comprises a first location;
determine, for each of the plurality of weather stations, a location of the weather station relative to the first location;
establish every possible combination of a predetermined number of weather stations from the plurality of weather stations;
calculate for each combination of the predetermined number of weather stations, an average location of the weather stations in the combination relative to the first location; and
select a combination from among every possible combination based at least in part on the average location of the selected combination from the first location for use in conjunction with at least one of subsequent weather updates, mapping, or navigation.

16. The computer program product of claim 15, wherein the predetermined number of weather stations is a first predetermined number, wherein every possible combination of the first predetermined number is every possible first combination, and wherein the program code instructions configured to select a first combination from among every possible first combination based on the average location of the selected combination comprise program code instructions to:
select a first combination from among every possible first combination of the first predetermined number of weather stations in response to the average location of the selected first combination satisfying a predetermined criteria;
in response to the average location of every possible first combination of the first predetermined number of weather stations failing to satisfy the predetermined criteria:
establish every possible second combination of a second predetermined number of weather stations from the plurality of weather stations;
calculate for each second combination of the second predetermined number of weather stations, an average location of the weather stations in the second combination relative to the first location; and
select a second combination from among every possible second combination based on the average location of the selected second combination relative to the first location for use in conjunction with at least one of subsequent weather updates, mapping, or navigation.

17. The computer program product of claim 16, wherein the second predetermined number is greater by one than the first predetermined number.

18. The computer program product of claim 15, wherein a location of a weather station relative to the first location is determined by:
converting a latitude and longitude of the weather station to local Cartesian coordinates with the first location being the origin, and summing values of the Cartesian coordinates for the weather station.

19. The computer program product of claim 15, further comprising program code instructions configured to:
determine, for each of the plurality of weather stations, a distance of the weather station from the first location; and
calculate, for each combination of the predetermined number of weather stations, an average distance of the weather stations in the combination from the first location;
wherein the program code instructions configured to select a combination from among every possible combination based at least in part on the average location of the selected combination from the first location comprise program code instructions configured to select a combination from among every possible combination based at least in part on the average location of the selected combination from the first location and the average distance of the selected combination from the first location.

20. The computer program product of claim 19, wherein the program code instructions configured to select a combination from among every possible combination based at least in part on the average location of the selected combination from the first location and the average distance of the selected combination from the first location comprise program code instructions configured to:
- apply a first weight to the average location for each combination to obtain a weighted average location for each combination;
- apply a second weight to the average distance for each combination to obtain a weighted average distance for each combination; and
- select a combination from among every possible combination based on a respective weighted average distance and weighted average location.

\* \* \* \* \*